(12) United States Patent
de Rouvray

(10) Patent No.: US 6,626,301 B2
(45) Date of Patent: Sep. 30, 2003

(54) COMPACT DISK HOLDER

(76) Inventor: John Alexander de Rouvray, 9 Ave Emile Deschanel, 75007 Paris (FR)

( * ) Notice: Subject to any disclaimer, the term of this patent is extended or adjusted under 35 U.S.C. 154(b) by 0 days.

(21) Appl. No.: 10/186,358

(22) Filed: Jun. 27, 2002

(65) Prior Publication Data

US 2003/0019825 A1 Jan. 30, 2003

Related U.S. Application Data

(60) Provisional application No. 60/301,556, filed on Jun. 27, 2001.

(51) Int. Cl.⁷ .................................................. A47G 29/00
(52) U.S. Cl. ......................................................... 211/40
(58) Field of Search ...................... 211/40, 41.4, 41.12, 211/89.01, 41.2; D6/407, 453; D14/478; 206/308.1; 312/9.1

(56) References Cited

U.S. PATENT DOCUMENTS 2,297,081 A * 9/1942 Slough .......................... 211/40
RE35,761 E * 4/1998 Dardashti ..................... 211/40
6,070,743 A * 6/2000 Hsueh .......................... 211/40

\* cited by examiner

*Primary Examiner*—Alvin Chin-Shue
*Assistant Examiner*—Sarah Purol
(74) *Attorney, Agent, or Firm*—Blakely, Sokoloff, Taylor & Zafman LLP

(57) ABSTRACT

A compact disk (CD) holder. The CDs rest in elongated slots cut into bow-shaped base and cover member. A pliable gasket between the members provides friction to retain the CDs.

9 Claims, 4 Drawing Sheets

COMPACT DISK HOLDER

This application claims benefit of Provisional No. 60/301,556 filed Jun. 27, 2001.

BACKGROUND OF THE INVENTION

The invention relates to the field of disk holders such as for compact disks.

DETAILED DESCRIPTION OF THE INVENTION

A holder for a compact disk or the like is described. The following description includes numerous specific details currently such as specific materials in order to provide a better understanding of the preferred embodiment. It will be apparent to one skilled in the art that the present invention may be practiced without these specific details. In other instances, well-known fabrication techniques have not been described in detail in order not to unnecessarily obscure the invention.

Figure 1:
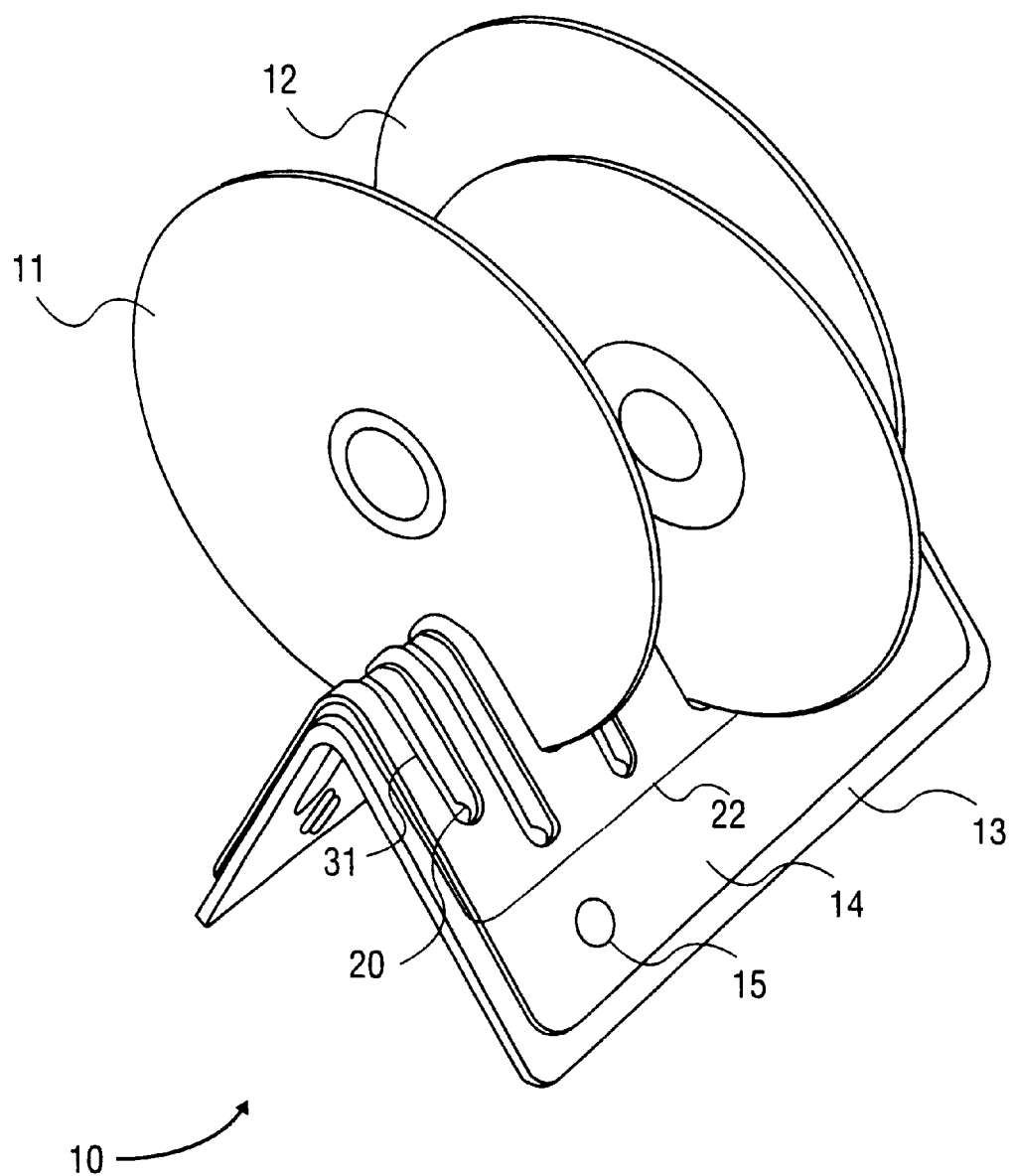
FIG. 1 is a perspective view of the holder containing several compact disks (CDs).
Figure 2:
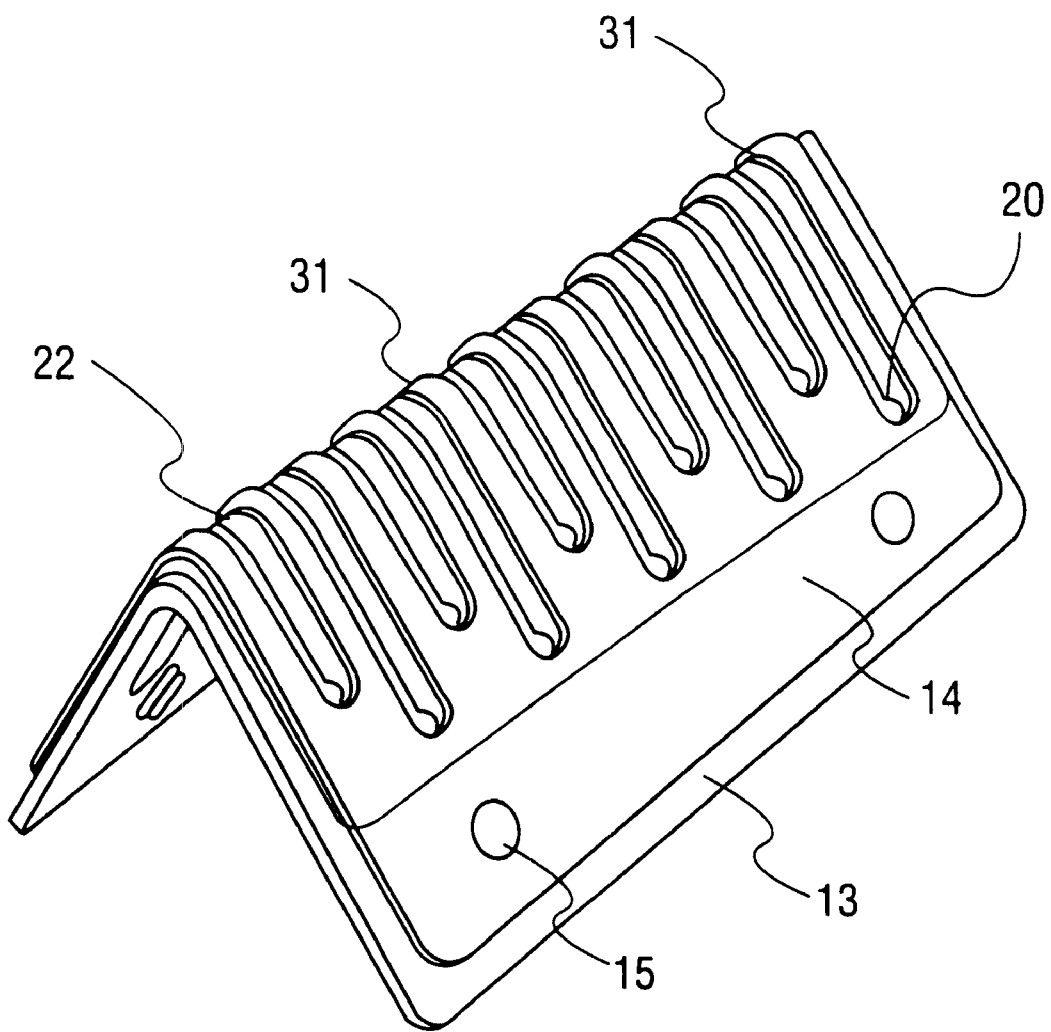
FIG. 2 is a perspective view of the holder.
Figure 3:
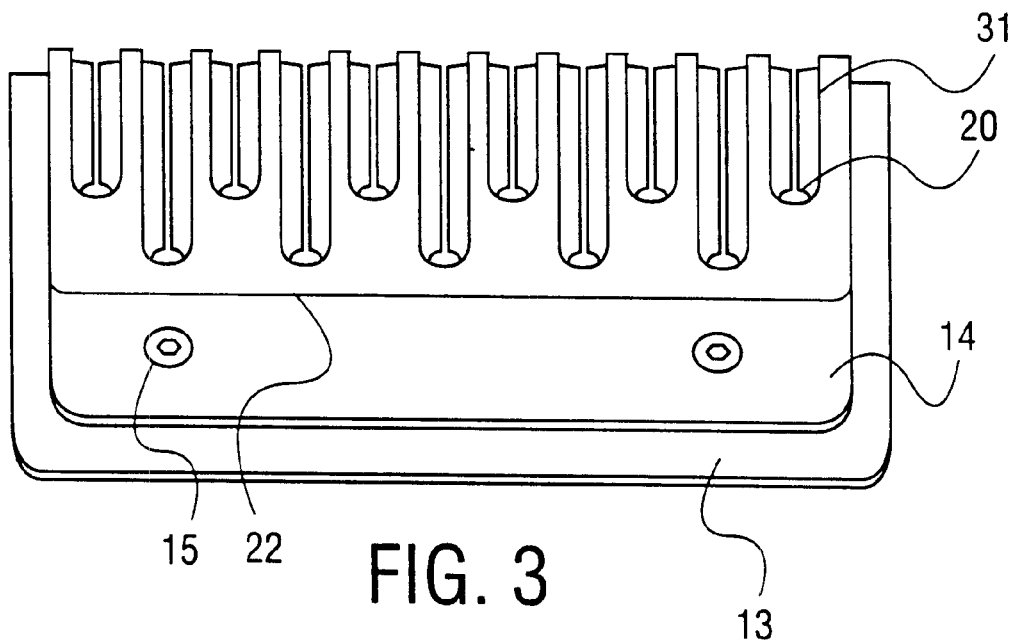
FIG. 3 is an elevation view of one side of the holder.
Figure 4:
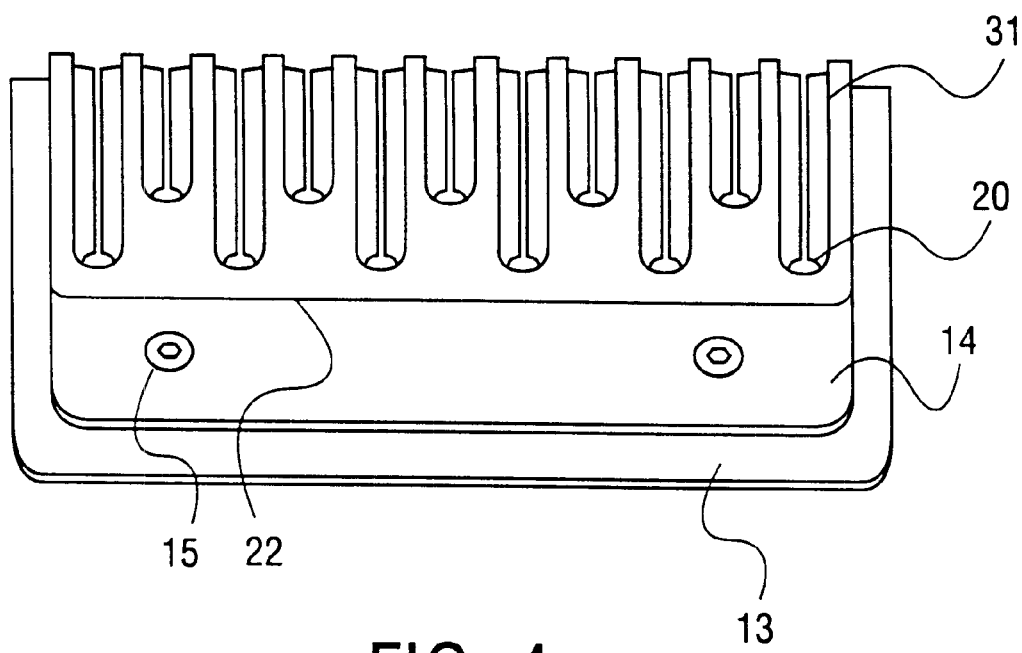
FIG. 4 is an elevation view of the opposite side of the holder.
Figure 5:
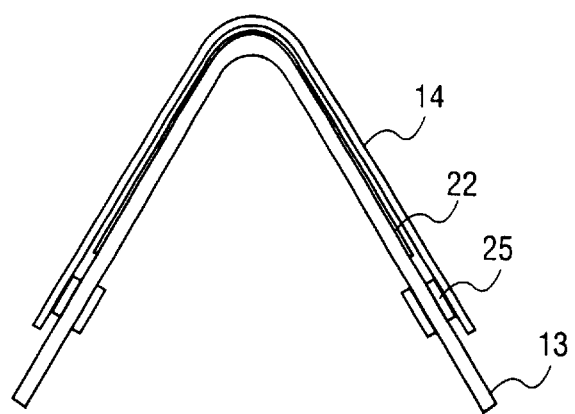
FIG. 5 is a side view of the holder.
Figure 6:
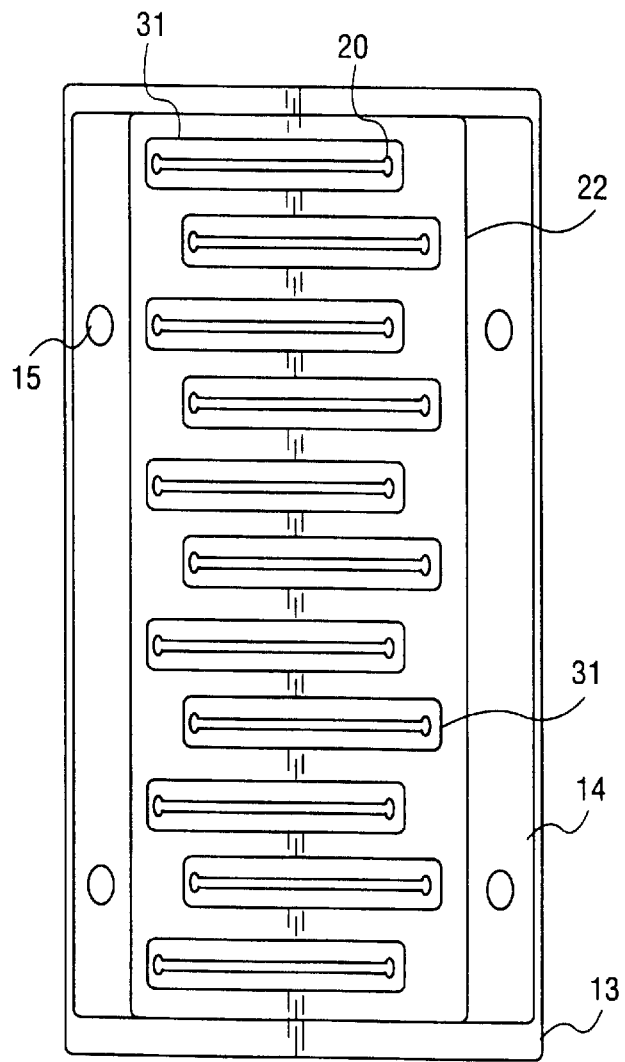
FIG. 6 is a top view of the holder.

Referring first to FIGS. 1 and 2, the CD holder 10 has a generally bowed shaped base 13 fabricated from, for instance, a colored transparent or translucent plastic. An overlying, bowed cover member 14 is fastened to the base 13 through four fasteners 15. The cover member 14 may be fabricated from plastic such as a sandblasted or frosted plastic. Both the base 13 and cover member 14 can be fabricated from other materials such as metal. A gasket 22 best seen in FIGS. 5 and 6 is disposed between the base 13 and the cover member 14.

A plurality of elongated slots 31 are disposed through, an aligned in both the base 13 and cover member 14. The slots 31 have a width which is several times greater than the width of a typical CD, for instance, four or five times the width of a CD.

Alternate slots 31 extend downward a greater distance on one side of the CD holder than the other. Because of this, when a CD is engaging a slot 31, it stands either to the right or left of the center of the bow-shaped base 13 and cover member 14. Thus, as best seen in FIG. 1, the CDs are asymmetrically disposed in the holder and extend alternately to one side or the other. This enable the CDs to be more readily inserted and removed from the holder in addition to being more visible thereby allowing easier identification.

Spacers 25 (best seen in FIG. 5) separate the base 13 from the cover member 14. The spacers are held in place by the fasteners 25. The spacers 25 have a thickness slightly less than the thickness of the gasket 22 which is disposed between the base 13 and the cover member 14. In this way, the gasket is held in place.

Slots 20 are cut in the gasket (best seen in FIG. 6). The slots 20 are centered on the slots 31 and form an opening which is less than the thickness of a CD. In this manner, when a CD is inserted into the holder within the slot 20, it brushes against the gasket. The friction between the gasket and the CD causes the CD to be held securely in place within the holder without causing any damage to the CD. The gasket can be fabricated from a pliable and scratch resistant material such as neoprene.

The fasteners 15 may be ordinary bolts or T-nuts. In lieu of fasteners, the base and cover member can be held together with welds, glue, press fit fixtures or other know techniques.

What is claimed is:

1. A disk holder comprising:
    a generally bow-shaped base having a plurality of elongated first slots;
    a bow-shaped cover member disposed over the base having a plurality of elongated second slots aligning with the first slots;
    a gasket disposed between the base and the cover member.

2. The disk holder defined by claim 1, wherein the width of the first and second slots is greater than the width of a disk.

3. The disk holder defined by claim 2, wherein alternate ones of the first and second slots extend downwardly a greater distance on one side of the base and cover member than on the other side.

4. The disk holder defined by claim 1 or 3, wherein the gasket member includes a plurality of elongated openings centered on the first and second slots.

5. The disk holder defined by claim 4, wherein the openings have a width less than a thickness of a disk.

6. The disk holder defined by claim 5, wherein the gasket comprises a pliable material.

7. The disk holder defined by claim 6, including fasteners for holding together the base and cover.

8. The disk holder defined by claim 7, wherein the base and cover are plastic.

9. The disk holder defined by claim 8, wherein the disk is a compact disk.

* * * * *